(12) United States Patent
Gao et al.

(10) Patent No.: US 9,774,375 B2
(45) Date of Patent: Sep. 26, 2017

(54) METHOD, SYSTEM, AND DEVICE FOR DETERMINING PRE-CODING MATRIX

(71) Applicant: China Academy of Telecommunications Technology, Beijing (CN)

(72) Inventors: Qiubin Gao, Beijing (CN); Meifang Jing, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/779,015

(22) PCT Filed: Mar. 21, 2014

(86) PCT No.: PCT/CN2014/073807
§ 371 (c)(1),
(2) Date: Sep. 22, 2015

(87) PCT Pub. No.: WO2014/146595
PCT Pub. Date: Sep. 25, 2014

(65) Prior Publication Data
US 2016/0056870 A1 Feb. 25, 2016

(30) Foreign Application Priority Data
Mar. 22, 2013 (CN) .......................... 2013 1 0095213

(51) Int. Cl.
*H04B 1/38* (2015.01)
*H04L 5/16* (2006.01)
(Continued)

(52) U.S. Cl.
CPC ......... *H04B 7/0456* (2013.01); *H04B 7/0639* (2013.01)
(Continued)

(58) Field of Classification Search
USPC ....... 375/211, 219, 220, 222, 221, 240, 239, 375/240.26–240.27, 254, 259, 284, 285,
(Continued)

(56) References Cited

U.S. PATENT DOCUMENTS 8,971,434 B2 * 3/2015 Frenne ................. H04B 7/0417
375/219
2010/0172430 A1 7/2010 Melzer et al.
(Continued)

FOREIGN PATENT DOCUMENTS

CN 101635612 A 1/2010
CN 101902312 A 12/2010
(Continued)

OTHER PUBLICATIONS

The Extended European Search Report issued on Feb. 8, 2016 in the EP counterpart application (14768903.8).
(Continued)

*Primary Examiner* — Linda Wong
(74) *Attorney, Agent, or Firm* — Kilpatrick Townsend & Stockton LLP

(57) ABSTRACT

A method, system, and device for determining a pre-coding matrix that can be used to determine an integral pre-coding matrix. The method of the embodiments of the present invention comprises: a user device determines a third pre-coding matrix according to a first pre-coding matrix and a second pre-coding matrix; an integral pre-coding matrix is determined according to the determined third pre-coding matrix, the integral pre-coding matrix being a sub-matrix of the third pre-coding matrix; integral pre-coding matrix information is determined according to the integral pre-coding matrix, and is transmitted to the network device. Because the user device determines that the integral pre-coding matrix is a sub-matrix of the third pre-coding matrix, which is deter-
(Continued)

mined according to the first pre-coding matrix and the second pre-coding matrix, the integral matrix code can be determined, thereby enhancing data transmission efficiency and system performance.

19 Claims, 5 Drawing Sheets

(51) Int. Cl.
*H04B 7/0456* (2017.01)
*H04B 7/06* (2006.01)

(58) Field of Classification Search
USPC ... 375/295, 296, 316, 324, 340, 346, 347, 3, 375/54, 358
See application file for complete search history.

(56) References Cited

U.S. PATENT DOCUMENTS

| | | | |
|---|---|---|---|
| 2011/0211662 A1 | 9/2011 | Varadarajan et al. | |
| 2012/0113830 A1* | 5/2012 | Zhu | H04B 7/024 370/252 |
| 2012/0219042 A1 | 8/2012 | Onggosanusi et al. | |
| 2013/0148755 A1* | 6/2013 | Melzer | H04B 7/0417 375/267 |
| 2014/0177745 A1* | 6/2014 | Krishnamurthy | H04B 7/0413 375/267 |
| 2014/0205031 A1* | 7/2014 | Nammi | H04B 7/0413 375/267 |
| 2015/0249961 A1* | 9/2015 | Wang | H04W 36/0083 370/329 |
| 2016/0065281 A1* | 3/2016 | Onggosanusi | H04B 7/0456 375/267 |
| 2016/0344465 A1* | 11/2016 | Wang | H04B 7/0634 |
| 2017/0163321 A1* | 6/2017 | Wang | H04B 7/0456 |

FOREIGN PATENT DOCUMENTS

| | | |
|---|---|---|
| CN | 102122980 A | 7/2011 |
| WO | 2009132092 A2 | 10/2009 |

OTHER PUBLICATIONS

International Search Report and Written Opinion of PCT/CN2014/073807.
Alcatel-Lucent Shanghai Bell et al: "Considerations on CSI feedback enhancements for high-priority antenna configurations", 3GPP DRAFT; R1-112420, vol. RAN WG1 , no. Athens, Greece; Aug. 22-26, 2011, 8 pages.

* cited by examiner

METHOD, SYSTEM, AND DEVICE FOR DETERMINING PRE-CODING MATRIX

This application is a US National Stage of International Application No. PCT/CN2014/073807, filed on Mar. 21, 2014, designating the United States and claiming the benefit of Chinese Patent Application No. 201310095213.2, filed with the State Intellectual Property Office of People's Republic of China on Mar. 22, 2013 and entitled "Method, system and device for determining pre-coding matrix", which is hereby incorporated by reference in its entirety.

FIELD

The present invention relates to the field of wireless communications and particularly to a method, system and device for determining a pre-coding matrix.

BACKGROUND

Closed-loop pre-coding technology has been introduced in the Long Term Evolution (LTE) Release 8 (Rel-8) system to improve the spectrum efficiency. Closed-loop pre-coding essentially requires the same set of pre-coding matrixes, referred to as a codebook, to be stored at both a base station and a User Equipment (UE). The UE estimates channel information according to a cell common pilot and then selects a pre-coding matrix from the codebook according to some criterion, which can be the maximizing mutual information, the maximizing output signal to interference and noise ratio, etc. The UE feeds an index of the selected pre-coding matrix in the codebook to the base station through an uplink channel, where the index is referred to as a Pre-coding Matrix Indicator (PMI). The base station can determine from the value of the received index the pre-coding matrix to be used for the UE. The pre-coding matrix reported by the UE can be considered as a quantized value of channel state information.

A Rank Indicator (RI) and a Channel Quality Indicator (CQI) will be reported by the UE in addition to the PMI, where the RI corresponds to the number of separate data streams in spatially multiplexed transmission, that is, the RI indicates the largest number of spatial data streams which can be supported over spatial channels from the base station to the UE, and the CQI indicates the quality of the channel from the base station to the UE as a criterion to select a modulation scheme and a coding rate. In the LTE and Long Term Evolution-Advanced (LTE-A) specification, a data block transmitted by the base station to the UE can be referred to as a codeword, and the base station can transmit at most two codewords concurrently to the UE, or may transmit only one codeword thereto, in spatial multiplexing. Data of a codeword are mapped onto one or more spatial data streams under some rule. If two codewords are transmitted, then the total number of data streams to which the two codewords are mapped shall not exceed the largest number of data streams which can be supported over the spatial channels from the base station to the UE, where the number is derived from the RI reported by the UE. If transmission of multiple data streams can be supported over the spatial channels, i.e., RI>1, which means that two codewords are transmitted by the base station to the UE, then the UE will calculate CQIs of the two codewords respectively and feed back the CQIs.

Different codebooks are designed in the LTE and the LTE-A for transmission of different numbers of data streams, so that the base station needs to determine the number of data streams according to the RI fed back by the UE to thereby determine from which of the codebooks the pre-coding matrix shall be selected, and the PMI indicates the index of the pre-coding matrix recommended by the UE in the corresponding codebook. Thus the pre-coding matrix recommended by the UE to the base station is determined by both the RI and the PMI fed back by the UE. The CQI corresponds to channel quality information under the condition that the base station applies the pre-coding matrix recommended by the UE.

In the existing cellular system, an array of antennas of the base station is typically arranged horizontally as illustrated in FIG. 1 and FIG. 2. A beam at a transmitting end, the base station, can only be adjusted horizontally with a common vertical down tilt angle, so various beam-forming/pre-coding technologies are overallly implemented based upon horizontal channel information. In fact, since a radio signal propagates in three dimensions in a space, the performance of the system can not be optimized with this common vertical down tilt angle. Adjusting of the beam in vertical direction will be of great significance to lowering inter-cell interference and improving the performance of the system. As the antenna technologies are developing, an array of active antennas in which array elements can be controlled separately has emerged in the industry as illustrated in FIG. 3A and FIG. 3B.

For the array of active antennas in which each of array elements is controlled separately, the network-side device needs to determine an overall pre-coding matrix, but there has been absent so far a solution to determine the overall pre-coding matrix.

SUMMARY

The invention provides a method, system and device for determining a pre-coding matrix so as to determine an overall pre-coding matrix.

An embodiment of the invention provides a method for determining a pre-coding matrix, the method including:

determining, by a user equipment, a third pre-coding matrix according to a first pre-coding matrix and a second pre-coding matrix;

determining, by the user equipment, an overall pre-coding matrix according to the determined third pre-coding matrix, wherein the overall pre-coding matrix is a sub-matrix of the third pre-coding matrix; and determining, by the user equipment, overall pre-coding matrix information according to the overall pre-coding matrix, and transmitting the overall pre-coding matrix information to a network-side device.

An embodiment of the invention provides another method for determining a pre-coding matrix, the method including:

receiving, by a network-side device, overall pre-coding matrix information from a user equipment; and determining, by the network-side device, an overall pre-coding matrix according to the overall pre-coding matrix information;

wherein the overall pre-coding matrix is a sub-matrix of a third pre-coding matrix determined according to a first pre-coding matrix and a second pre-coding matrix.

An embodiment of the invention provides a user equipment for determining a pre-coding matrix, the user equipment including:

a first determining module configured to determine a third pre-coding matrix according to a first pre-coding matrix and a second pre-coding matrix;

a second determining module configured to determine an overall pre-coding matrix according to the determined third pre-coding matrix, wherein the overall pre-coding matrix is a sub-matrix of the third pre-coding matrix; and a reporting module configured to determine overall pre-coding matrix information according to the overall pre-coding matrix, and to transmit the overall pre-coding matrix information to a network-side device.

An embodiment of the invention provides a network-side device for determining a pre-coding matrix, the network-side device including:

a receiving module configured to receive overall pre-coding matrix information from a user equipment; and a third determining module configured to determine an overall pre-coding matrix according to the overall pre-coding matrix information;

wherein the overall pre-coding matrix is a sub-matrix of a third pre-coding matrix determined according to a first pre-coding matrix and a second pre-coding matrix.

An embodiment of the invention provides a system for determining a pre-coding matrix, the system including:

a user equipment configured to determine a third pre-coding matrix according to a first pre-coding matrix and a second pre-coding matrix; to determine an overall pre-coding matrix according to the determined third pre-coding matrix, wherein the overall pre-coding matrix is a sub-matrix of the third pre-coding matrix; and to determine overall pre-coding matrix information according to the overall pre-coding matrix, and to transmit the overall pre-coding matrix information to a network-side device; and the network-side device configured to receive the overall pre-coding matrix information from the user equipment; and to determine the overall pre-coding matrix according to the overall pre-coding matrix information, wherein the overall pre-coding matrix is the sub-matrix of the third pre-coding matrix determined according to the first pre-coding matrix and the second pre-coding matrix.

Another embodiment of the invention provides a user equipment including a transceiver, a processor and a memory, wherein:

the memory is configured to store one or more executable programs, wherein the one or more executable programs are configured to configure the processor; and the processor is configured with the one or more executable programs to perform a method including: determining a third pre-coding matrix according to a first pre-coding matrix and a second pre-coding matrix; determining an overall pre-coding matrix according to the determined third pre-coding matrix, wherein the overall pre-coding matrix is a sub-matrix of the third pre-coding matrix; and determining overall pre-coding matrix information according to the overall pre-coding matrix, and transmitting the overall pre-coding matrix information to a network-side device through the transceiver.

Another embodiment of the invention provides a network-side device including a transceiver, a processor and a memory, wherein:

the memory is configured to store one or more executable programs, wherein the one or more executable programs are configured to configure the processor; and the processor is configured with the one or more executable programs to perform a method including: determining an overall pre-coding matrix according to the overall pre-coding matrix information, wherein the overall pre-coding matrix is a sub-matrix of a third pre-coding matrix determined according to a first pre-coding matrix and a second pre-coding matrix.

The user equipment can determine the overall pre-coding matrix by determining the overall pre-coding matrix as a sub-matrix of the third pre-coding matrix determined from the first pre-coding matrix and the second pre-coding matrix, so that the network-side device can operate using the overall pre-coding matrix instead of operating using a vertical or horizontal pre-coding matrix for the array of active antennas in which array elements are controlled separately, to thereby improve the efficiency of transmitting data and the performance of the system.

BRIEF DESCRIPTION OF THE DRAWINGS

In order to make the technical solutions according to the embodiments of the invention more apparent, the drawings to which reference will be made in the description of the embodiments will be described below briefly, and apparently the drawings described below are illustrative only some of the embodiments of the invention, and those ordinarily skilled in the art can further derive other drawings from these embodiments here without any inventive effort. In the drawings.

DETAILED DESCRIPTION OF THE EMBODIMENTS

In order to make the objects, technical solutions and advantages of the invention more apparent, the invention will be described below in further details with reference to the drawings, and apparently the embodiments described below are only some but not all of the embodiments of the invention. All the other embodiments which can occur to those ordinarily skilled in the art based upon the embodiments here of the invention without any inventive effort shall fall into the scope of the invention as claimed.

In the embodiments of the invention, a user equipment transmits overall pre-coding matrix information, which is utilized for determining an overall pre-coding matrix, to a network-side device, where the overall pre-coding matrix is a sub-matrix of a third pre-coding matrix determined from a first pre-coding matrix and a second pre-coding matrix. The user equipment can determine a sub-matrix of the third pre-coding matrix determined from the first pre-coding matrix and the second pre-coding matrix to be the overall pre-coding matrix, to thereby improve the efficiency of transmitting data and the performance of the system.

In the following description, firstly an implementation with cooperation of the network side and the user equipment side will be described, and then implementations at the network side and the user equipment side will be described respectively, but this will not suggest required cooperation of both the sides for an implementation, and in fact, problems encountered respectively at the network side and the user equipment side will also be addressed in the separate implementations at the network side and the user equipment side, although a better technical effect can be achieved in the implementation with cooperation of both the sides.

Figure 1:
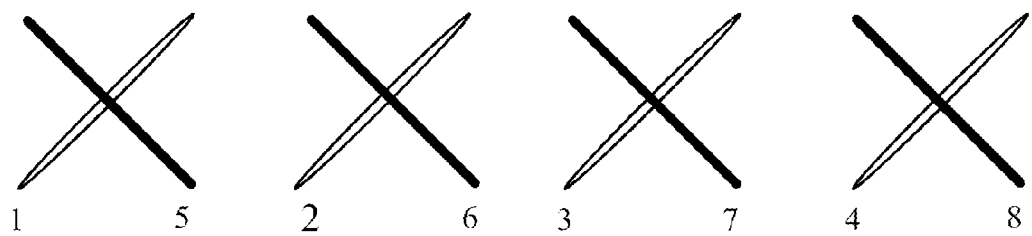
FIG. 1 illustrates a schematic diagram of horizontally arranged dual-polarized antennas in the prior art.
Figure 2:
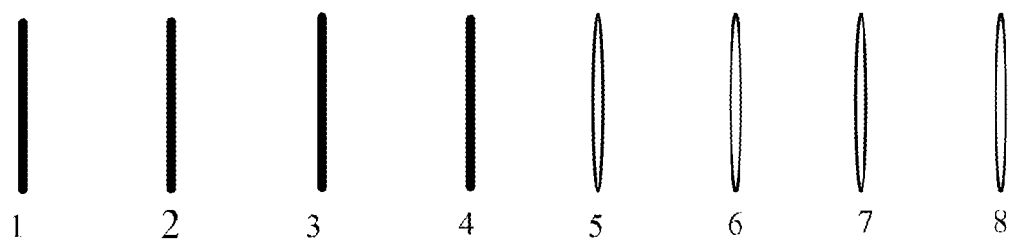
FIG. 2 illustrates a schematic diagram of an array of horizontally arranged antennas in the prior art.
Figure 3A:
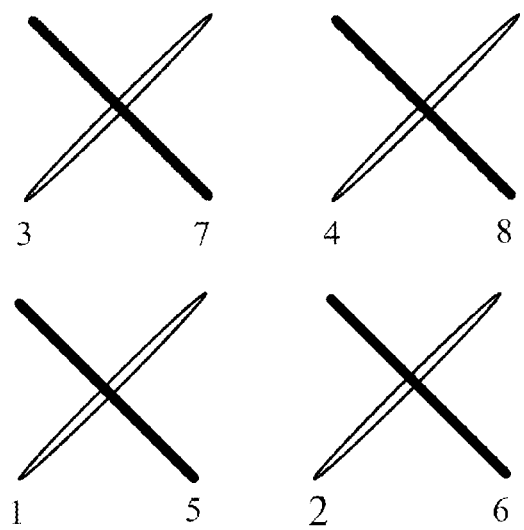
FIG. 3A illustrates a schematic diagram of dual-polarized antennas arranged horizontally in two dimensions in the prior art.
Figure 3B:
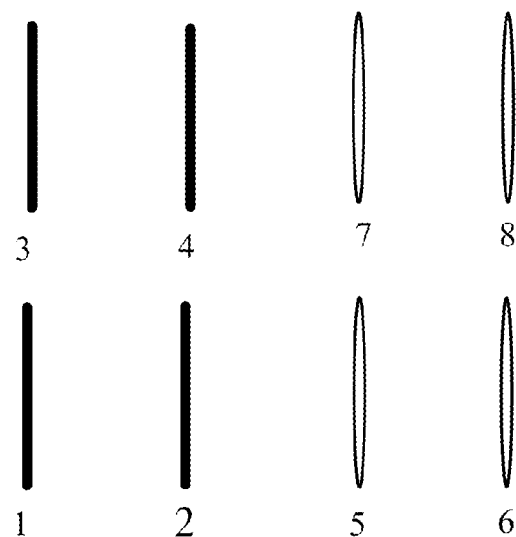
FIG. 3B illustrates a schematic diagram of an array of antennas arranged vertically in two dimensions in the prior art.
Figure 4:
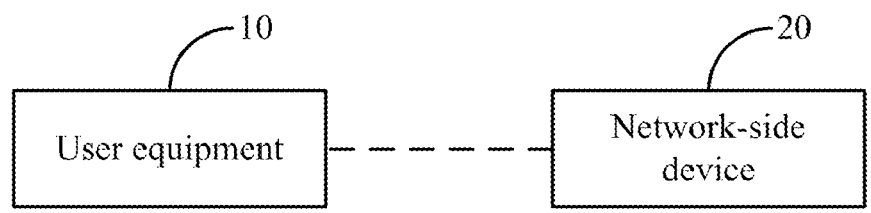
FIG. 4 illustrates a schematic structural diagram of a system for determining a pre-coding matrix according to an embodiment of the invention.

As illustrated in FIG. 4, a system for determining a pre-coding matrix according to an embodiment of the invention includes a user equipment 10 and a network-side device 20.

The user equipment 10 is configured to determine a third pre-coding matrix according to a first pre-coding matrix and a second pre-coding matrix; to determine an overall pre-coding matrix according to the determined third pre-coding matrix, wherein the overall pre-coding matrix is a sub-matrix of the third pre-coding matrix; and to determine overall pre-coding matrix information according to the overall pre-coding matrix, and to transmit the overall pre-coding matrix information to the network-side device; and The network-side device 20 is configured to receive the overall pre-coding matrix information from the user equipment; and to determine the overall pre-coding matrix according to the overall pre-coding matrix information, where the overall pre-coding matrix is the sub-matrix of the third pre-coding matrix which is determined according to the first pre-coding matrix and the second pre-coding matrix.

Here the number of columns in the overall pre-coding matrix is no more than the product of the number of columns in the first pre-coding matrix and the number of columns in the second pre-coding matrix; or the number of rows in the overall pre-coding matrix is no more than the product of the number of rows in the first pre-coding matrix and the number of rows in the second pre-coding matrix.

In an implementation, the user equipment can further transmit a first PMI, a first RI, a second PMI, and a second RI to the network-side device. The first PMI is the index of the first pre-coding matrix in a codebook; the second PMI is the index of the second pre-coding matrix in the codebook; the first RI is the number of columns or the number of rows in the first pre-coding matrix; and the second RI is the number of columns or the number of rows in the second pre-coding matrix.

Correspondingly the network-side device receives the first PMI, the first RI, the second PMI, and the second RI from the user equipment; determines the first pre-coding matrix according to the first PMI and the first RI, and determines the second pre-coding matrix according to the second PMI and the second RI; and determines the third pre-coding matrix according to the first pre-coding matrix and the second pre-coding matrix, and determines the overall pre-coding matrix according to the third pre-coding matrix.

In an implementation, a first dimension is a horizontal dimension, and a second dimension is a vertical dimension; or the first dimension is the vertical dimension, and the second dimension is the horizontal dimension. If the first dimension is the horizontal dimension, then the first pre-coding matrix is a horizontal pre-coding matrix, the first PMI is a horizontal PMI, the first RI is a horizontal RI, the first CQI is a horizontal CQI, the second dimension is a vertical dimension, the second pre-coding matrix is a vertical pre-coding matrix, the second PMI is a vertical PMI, the second RI is a vertical RI, and the second CQI is a vertical CQI.

If the first dimension is the vertical dimension, then the first pre-coding matrix is a vertical pre-coding matrix, the first PMI is a vertical PMI, the first RI is a vertical RI, the first CQI is a vertical CQI, the second dimension is a horizontal dimension, the second pre-coding matrix is a horizontal pre-coding matrix, the second PMI is a horizontal PMI, the second RI is a horizontal RI, and the second CQI is a horizontal CQI.

The user equipment can transmit the first PMI, the first RI, the second PMI, and the second RI together or separately. For example, the first PMI and the first RI can be placed in first channel state information, the second PMI and the second RI can be placed in second channel state information, so that the first channel state information and the second channel state information can be transmitted respectively or together; or such information can be transmitted separately or packaged and transmitted together while not placing in the channel state information.

Here the network-side device can determine the overall pre-coding matrix by transmitting a Channel State Information Reference Signal (CSI-RS) to the user equipment; and the user equipment can receive the CSI-RS transmitted by the network-side device, perform channel estimation, obtain estimated values of channels from the network-side device to the user equipment, and then determine the information above respectively from the estimated values of the channels.

In an implementation, the first PMI, the first RI, the second PMI, and the second RI can be determined in a number of ways, two of which will be described below.

1. The network-side device transmits a first channel state information reference signal and a second channel state information reference signal respectively. The user equipment receives the first and second channel state information reference signal respectively, and estimates the channels in the first dimension and the channels in the second dimension. The user equipment calculates the first RI and the first pre-coding matrix from the channels in the first dimension, and the user equipment calculates the second RI and the second pre-coding matrix from the channels in the second dimension.

2. The network-side device transmits a channel state information reference signal, and the user equipment estimates the channels from the reference signal. The user equipment extracts the channels corresponding to the first dimension and the second dimension from the estimated channels. For example, the reference signal transmitted by the network-side device includes N ports, where $N=N_1 \times N_2$, $N_1$ represents the number of antenna elements in the first dimension, and $N_2$ represents the number of antenna elements in the second dimension, so channels corresponding to the ports 0 to $N_1-1$ are the channels in the first dimension, and channels corresponding to the ports [0, $N_1$, $2N_1$, ..., $(N_2-1)*N_1$] are the channels in the second dimension. The user equipment calculates the first pre-coding matrix and the first RI, and the second pre-coding matrix and the second RI using the channels in the first dimension and the channels in the second respectively.

Preferably the user equipment can further determine the first CQI corresponding to each codeword and/or the second CQI corresponding to each codeword. The first CQI can also be placed in the first channel state information or transmitted separately; and the second CQI can also be placed in the second channel state information or transmitted separately.

The user equipment calculates the first PMI, the first RI, the first CQI, the second PMI, the second RI, and the second CQI from the estimated values of the channels. The first RI is represented as $r_H$, and the first RI refers to the number of separately transmitted data streams which can be supported over the spatial channels in the first dimension; the first pre-coding matrix is represented as $W_H$, and the index of the first pre-coding matrix in the codebook is represented as $PMI_H$, and $W_H$ corresponds to $PMI_H$ in a one-to-one manner; the first CQI is represented as $CQI_H$; the second RI is represented as $r_V$, and the second RI refers to the number of separately transmitted data streams which can be supported over the spatial channels in the second dimension; the second pre-coding matrix is represented as $W_V$, and the index of the second pre-coding matrix in the codebook is represented as $PMI_V$, and $W_V$ corresponds to $PMI_V$ in a one-to-one manner; and the second CQI is represented as $CQI_H$, where the first CQI and the second CQI are optional.

Here the user equipment determines the overall pre-coding matrix according to the first pre-coding matrix corresponding to the first PMI, and the second pre-coding matrix corresponding to the second PMI, where the number of columns or the number of rows in the overall pre-coding matrix is no more than the product of the first RI and the second RI.

The overall pre-coding matrix is a matrix composed of N columns or N rows in the third pre-coding matrix.

Preferably the overall pre-coding matrix is a matrix composed of first N columns or first N rows in the third pre-coding matrix.

N is no more than the product of the number of columns in the first pre-coding matrix and the number of columns of the second pre-coding matrix; or N is no more than the product of the number of rows in the first pre-coding matrix and the number of rows in the second pre-coding matrix.

Here the user equipment can determine the overall pre-coding matrix so that when the network side device transmits data to the user equipment using the overall pre-coding matrix determined by the user equipment, a channel performance parameter can satisfy a preset condition.

The channel performance parameter can be a throughput, a signal to noise ratio or another parameter. The preset condition is that the value of the parameter is the largest, or the value of the parameter is above a preset threshold, etc.

The following description will be given of an example in which the channel performance parameter is the throughput, and the preset condition is that the value of the parameter is the largest.

Particularly the user equipment determines the third pre-coding matrix according to the first pre-coding matrix corresponding to the first PMI, and the second pre-coding matrix corresponding to the second PMI, where the number of columns in the third pre-coding matrix is the product of the first RI and the second RI; and The user equipment selects a matrix composed of N columns in the third pre-coding matrix as the overall pre-coding matrix, where N represents the number of separately transmitted data streams when the throughput being highest; or The user equipment selects a matrix composed of first N rows in the third pre-coding matrix as the overall pre-coding matrix, where N represents the number of separately transmitted data streams at the highest throughput.

Since N represents the number of separately transmitted data streams when the throughput being highest, the number of data streams corresponding to the determined overall pre-coding matrix is no less than the number of separate data streams which can be transmitted in reality over the spatial channels.

In an implementation, the user equipment can determine the third pre-coding matrix in the following equation:

The third pre-coding matrix is calculated as $W=f(W_H, W_V)=W_H \otimes W_V$ or $W=f(W_H,W_V)=W_V \otimes W_H$, where the number of columns in the third pre-coding matrix W is $r=r_V \times r_H$; and $A \otimes B$ represents the Kronecker product of a matrix A and a matrix B.

The overall pre-coding matrix is composed of $r_T$ columns or rows in $W=f(W_H,W_V)$. For example the overall pre-coding matrix is composed of first $r_T$ columns or rows in $W=f(W_H,W_V)$, that is, $W_T=W[1:r_T]=f(W_H,W_V)[1:r_T]$, where B[1:n] represents a matrix composed of the first column to the n-th column in the matrix B.

The $r_T$ columns or rows in the third pre-coding matrix $W=f(W_H,W_V)$ are selected by the user equipment as the overall pre-coding matrix, where $r_T$ represents an overall RI. The overall RI is the number of separately transmitted data streams which can be supported over the overall space channels from the network-side device to the user equipment (including the first and second dimensions (i.e., the horizontal and vertical dimensions)), where $1 \le r_T \le r_H \times r_V$.

The value of N (i.e., $r_T$) can be determined by determining first i columns in the matrix W as a pre-coding matrix, and calculating a throughput assuming that the network-side device transmits data for the user equipment using the pre-coding matrix, where if the throughput is represented as $B_i$, then $$r_T = \arg\max_{i=1,\ldots,r} B_i.$$

That is, $r_T$ represents the number of separately transmitted data streams when the throughput being highest, where first several columns or rows in the third pre-coding matrix W are selected as the overall pre-coding matrix, and the value of $r_T$ is the number of columns in the pre-coding matrix when the throughput being highest.

If i>1, then the user equipment assumes that the base station transmits multiple data streams to the network-side device, and the throughput is the sum of throughputs of the multiple data streams.

Preferably, if the user equipment determines the first CQI corresponding to each codeword and/or the second CQI corresponding to each codeword, and the corresponding RI is more than 1, then the overall RI and the overall pre-coding matrix can be calculated in a further optimized process.

Particularly the user equipment permutes the first pre-coding matrix according to the first CQI corresponding to each codeword; and then determines the third pre-coding matrix according to the permuted first pre-coding matrix, and the second pre-coding matrix corresponding to the second PMI; or The user equipment permutes the second pre-coding matrix according to the second CQI corresponding to each codeword; and then determines the third pre-coding matrix according to the first pre-coding matrix, and the permuted second pre-coding matrix corresponding to the second PMI; or The user equipment permutes the first pre-coding matrix according to the first CQI corresponding to each codeword, and permutes the second pre-coding matrix according to the second CQI corresponding to each codeword; and then determines the third pre-coding matrix according to the permuted first pre-coding matrix, and the permuted second pre-coding matrix corresponding to the second PMI.

An optimized method will be described below by way of an example in which the user equipment transmits the first CQI to the network-side device, and the first RI is more than 1. If the user equipment transmits the second CQI to the network-side device, and the second RI is more than 1, or the user equipment transmits the first CQI and the second CQI to the network-side device, and both the first RI and the second RI are more than 1, the same optimized method will apply, so a repeated description thereof will be omitted here.

Columns of $W_H$ are permuted. Since the corresponding first RI is more than 1, the user equipment will calculate CQIs of two codewords (here the two codewords are described as an example, although the same method will apply to more than two codewords). Following the mapping relationship of codewords to data streams, if the first codeword corresponds to the first column to the L-th column of $W_H$, and the second codeword corresponds to the (L+1)-th column to the $r_H$-th column, a particular value of L is determined by $r_H$ and the mapping relationship of codewords to data streams.

The pre-coding matrix can be permuted by arranging the columns corresponding to the each codeword in an descending order of CQIs, where the permuted matrix is represented as PERMU($W_H$). For example, if the CQI of the second codeword is more than the CQI of the first codeword, then the (L+1)-th column to the $r_H$-th column in $W_H$ corresponding to the second codeword are arranged respectively into the first column to the ($r_H$-L)-th column in PERMU($W_H$), and the first column to the L-th column in $W_H$ corresponding to the first codeword are arranged respectively into the ($r_H$-L+1) column to the $r_H$-th column in PERMU($W_H$).

The third pre-coding matrix is calculated as W=f ($W_H$, $W_V$)=PERMU($W_H$)⊗ $W_V$ or W=f($W_H$,$W_V$)=$W_V$⊗ PERMU ($W_H$), the number of columns in the third pre-coding matrix W is r=$r_V$×$r_H$.

With this optimization step, the determined overall pre-coding matrix can be ensured to correspond to the space channels with a higher channel quality.

In an implementation, the permutation of the matrix is swapping of the columns in the matrix, that is, PERMU ($W_H$)=$W_H$A, where A represents a column-swapped matrix expressed as follows:

$$A = \begin{bmatrix} Z & I_{L \times L} \\ I_{(r_H-L) \times (r_H-L)} & Z \end{bmatrix}.$$

Where $I_{L \times L}$ represents an L×L identity matrix, $I_{(r_H-L) \times (r_H-L)}$ represents a ($r_H$-L)×($r_H$-L) identity matrix, and Z represents a matrix with appropriate dimensions and all of elements of Z are zero (that is, Z at the left top corner is a matrix of L rows by ($r_H$-L) columns, and there is a matrix of the ($r_H$-L) rows by L columns at the bottom right, in the equation above). A particular value of the column-swapped matrix is determined by $r_H$, L, a result of comparing the CQIs of the two codewords, the mapping relationship of codewords to data streams, and other factors.

Here the network-side device determines the third pre-coding matrix according to the first pre-coding matrix corresponding to the first PMI, and the second pre-coding matrix corresponding to the second PMI, where the number of columns or the number of rows in the third pre-coding matrix is equal to the product of the first RI and the second RI; and determines the overall pre-coding matrix according to the third pre-coding matrix.

Preferably if the network-side device receives the first CQI corresponding to each codeword and/or the second CQI corresponding to each codeword, determined by the user equipment, and the corresponding RI is more than 1, then the overall RI and the overall pre-coding matrix can be calculated in a further optimized process.

Particularly the network-side device permutes the first pre-coding matrix according to the first CQI corresponding to each codeword; and then determines the third pre-coding matrix according to the permuted first pre-coding matrix, and the second pre-coding matrix corresponding to the second PMI; or The network-side device permutes the second pre-coding matrix according to the second CQI corresponding to each codeword; and then determines the third pre-coding matrix from the first pre-coding matrix, and the permuted second pre-coding matrix corresponding to the second PMI; or The network-side device permutes the first pre-coding matrix according to the first CQI corresponding to each codeword, and permutes the second pre-coding matrix according to the second CQI corresponding to each codeword; and then determines the third pre-coding matrix from the permuted first pre-coding matrix, and the permuted second pre-coding matrix corresponding to the second PMI.

An optimized method will be described below by way of an example in which the user equipment transmits the first CQI to the network-side device, and the first RI is more than 1. If the user equipment transmits the second CQI to the network-side device, and the second RI is more than 1, or the user equipment transmits the first CQI and the second CQI to the network-side device, and both the first RI and the second RI are more than 1, the same optimized method will apply, so a repeated description thereof will be omitted here.

The third pre-coding matrix is W=f($W_H$,$W_V$)=PERMU ($W_H$)⊗ $W_V$ or W=f($W_H$,$W_V$)=$W_V$⊗ PERMU($W_H$), where PERMU($W_H$) represents a column-permuted matrix of $W_H$.

In an implementation, different overall pre-coding matrix information can be processed particularly in a number of different approaches, several ones of which will be listed below.

In a first approach, the overall pre-coding matrix information comprises an overall RI, where the overall RI is the number of columns or the number of rows in the overall pre-coding matrix.

The user equipment determines the number of columns in the overall pre-coding matrix as the overall RI, or the number of rows in the overall pre-coding matrix as the overall RI.

Correspondingly the network-side device selects N columns or N rows in the third pre-coding matrix to constitute the overall pre-coding matrix, where N represents the overall RI.

Particularly the network-side device determines the first $r_T$ (i.e., N) columns in the matrix $W=f(W_H,W_V)$ as the overall pre-coding matrix $W_T$, where $W_T=W[1:r_T]=f(W_H, W_V)[1:r_T]$.

$$f(W_H,W_V)=W_H \otimes W_V \text{ or } f(W_H,W_V)=W_V \otimes W_H.$$

If the columns are permuted, then $W=f(W_H,W_V)=\text{PERMU}(W_H) \otimes W_V$ or $W=f(W_H,W_V)=W_V \otimes \text{PERMU}(W_H)$, where $\text{PERMU}(W_H)$ represents a column-permuted matrix of $W_H$.

In a second approach, the overall pre-coding matrix information is a matrix indicator.

The user equipment sets the value of the matrix indicator to a value indicating that a corresponding candidate matrix is the overall pre-coding matrix, where one of values of the matrix indicator corresponds to one candidate matrix determined from the third pre-coding matrix.

Correspondingly the network-side device determines the candidate matrix corresponding to the value of the matrix indicator as the overall pre-coding matrix, where one of the values of the matrix indicator corresponds to one candidate matrix determined from the third matrix.

Particularly the user equipment can select $r_T$ columns (or rows) in the third pre-coding matrix $W=f(W_H,W_V)$ as the overall pre-coding matrix in such a way that the user equipment traverses all of possible combinations of columns (or rows), selects optimum one of the combinations (i.e., a combination providing the number of separately transmitted data streams to satisfy the throughput being highest), and determines the corresponding number of columns (or rows) as the overall RI. The user equipment needs to transmit an indicator which indicates the selected columns (or rows) to the network-side device, for example, in a bitmap where the values of bits corresponding to the selected columns (or rows) are set to "1", and the values of bits corresponding to the unselected columns (or rows) are set to "0". The network-side device will also traverse all of the possible combinations of columns (or rows) in the same order as the user equipment after determining the third pre-coding matrix, so that the network-side device and the user equipment can have the same understanding of the matrix corresponding to the bits in the matrix indicator, and then the network-side device can determine the matrix corresponding to the bits, the values of which are set to 1, as the overall pre-coding matrix.

Or the user equipment sets the value of a bit in the matrix indicator corresponding to a row or column in the third pre-coding matrix to a value indicating that the overall pre-coding matrix includes the corresponding row or column; and Correspondingly the network-side device combines the corresponding columns (or rows) in the third pre-coding matrix into the overall pre-coding matrix according to the values of the bits in the matrix indicator.

Particularly the user equipment can select $r_T$ columns (or rows) in the third pre-coding matrix $W=f(W_H,W_V)$ as the overall pre-coding matrix in such a way that the user equipment sets the values of bits corresponding to the $r_T$ columns (or rows) to values indicating that the overall pre-coding matrix includes the corresponding columns (or rows), for example, in a bitmap where the value of a bit is set to "1" indicating a corresponding column or (row) belongs to the overall pre-coding matrix, and the value of bit is set to "0" indicating the corresponding column or (row) does not belong to the overall pre-coding matrix. The network-side device can combine the corresponding rows or columns in the third pre-coding matrix into the overall pre-coding matrix according to the values of the bits after determining the third pre-coding matrix.

In the description of the examples, the overall pre-coding matrix can be determined by selecting the first N columns (or rows) in the third pre-coding matrix or by selecting the last N columns (or rows) in the third pre-coding matrix or by selecting N columns (or rows) in a prescribed order.

Here the network-side device preprocesses data to be transmitted to the user equipment according to the determined overall pre-coding matrix.

Preferably the user equipment transmits the overall CQI corresponding to the overall pre-coding matrix to the network-side device, where the overall CQI is determined by the user equipment under the assumption that the network-side device transmits data to the user equipment using the overall pre-coding matrix; and correspondingly the network-side device modulates and/or selects a coding rate according to the overall CQI corresponding to the received overall pre-coding matrix from the user equipment.

Preferably the user equipment can determine the overall CQI by determining the overall pre-coding matrix through calculating the corresponding CQI for each candidate pre-coding matrix, so the user equipment only needs to retrieve the CQI corresponding to the finally determined overall pre-coding matrix instead of recalculating it.

Here the network-side device according to the embodiment of the invention can be a base station (e.g., a macro base station, a home base station, etc.) or a Relay Node (RN) device or another network-side device.

Figure 5:
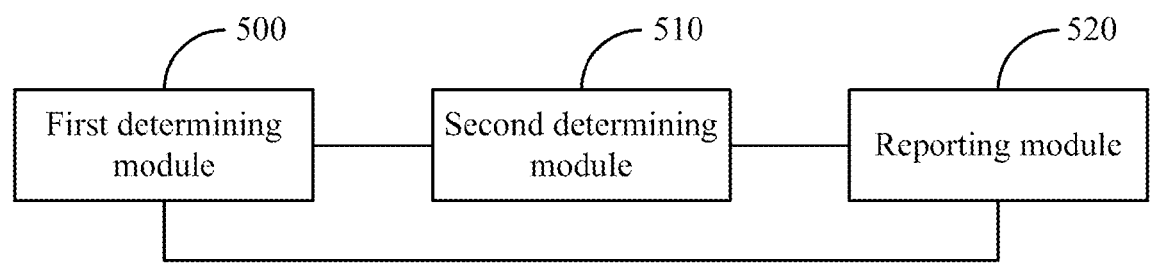
FIG. 5 illustrates a schematic structural diagram of a user equipment in a system for determining a pre-coding matrix according to an embodiment of the invention.

As illustrated in FIG. 5, a user equipment in a system for determining a pre-coding matrix according to an embodiment of the invention includes a first determining module 500, a second determining module 510, and a reporting module 520.

The first determining module 500 is configured to determine a third pre-coding matrix according to a first pre-coding matrix and a second pre-coding matrix;

The second determining module 510 is configured to determine an overall pre-coding matrix according to the determined third pre-coding matrix, wherein the overall pre-coding matrix is a sub-matrix of the third pre-coding matrix; and The reporting module 520 is configured to determine overall pre-coding matrix information according to the overall pre-coding matrix, and to transmit the overall pre-coding matrix information to a network-side device.

Preferably the first determining module 500 is further configured:

To transmit a first PMI, a first RI, a second PMI, and a second RI to the network-side device after the first pre-coding matrix and the second pre-coding matrix are determined;

Where the first PMI is an index of the first pre-coding matrix in a codebook; the second PMI is an index of the second pre-coding matrix in the codebook; the first RI is the number of columns or the number of rows in the first pre-coding matrix; and the second RI is the number of columns or the number of rows in the second pre-coding matrix.

Preferably the third pre-coding matrix is $W=W1 \otimes W2$ or $W=W2 \otimes W1$;

W1 represents the first pre-coding matrix, W2 represents the second pre-coding matrix, and $A \otimes B$ represents a Kronecker product of a matrix A and a matrix B.

Preferably the overall pre-coding matrix is a matrix composed of N columns or N rows in the third pre-coding matrix.

Preferably the overall pre-coding matrix is a matrix composed of first N columns or first N rows in the third pre-coding matrix.

Preferably N is no more than the product of the number of columns in the first pre-coding matrix and the number of columns of the second pre-coding matrix; or N is no more than the product of the number of rows in the first pre-coding matrix and the number of rows in the second pre-coding matrix.

Preferably the second determining module 510 is further configured:

To permute the first pre-coding matrix according to a first CQI corresponding to each codeword; and/or to permute the second pre-coding matrix according to a second CQI corresponding to each codeword, before the third pre-coding matrix is determined according to the first pre-coding matrix and the second pre-coding matrix.

Preferably the overall pre-coding matrix information is comprises an overall RI, where the overall RI is the number of columns or the number of rows in the overall pre-coding matrix.

Preferably the reporting module 520 is configured:

If the overall pre-coding matrix information is a matrix indicator, to set a value of the matrix indicator to a value indicating that a corresponding candidate matrix is the overall pre-coding matrix, where one of values of the matrix indicator corresponds to a candidate matrix determined from the third pre-coding matrix; or to set a value of a bit in the matrix indicator corresponding to a row or column in the third pre-coding matrix to a value indicating that the overall pre-coding matrix includes the corresponding row or column.

Preferably the reporting module 520 is configured:

To determine an overall CQI, where the overall CQI is determined by the user equipment assuming that the network-side device transmits data to the user equipment using the overall pre-coding matrix; and to transmit the overall CQI to the network-side device, so that the network-side device modulates and/or selects a coding rate according to the overall CQI.

Figure 6:
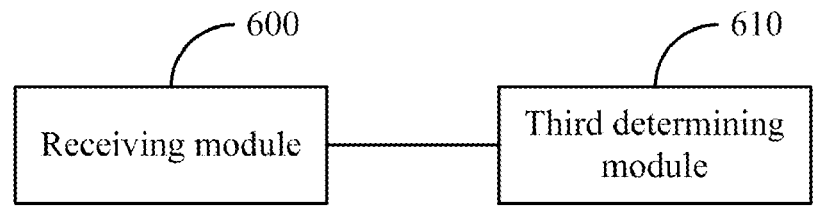
FIG. 6 illustrates a schematic structural diagram of a network-side device in a system for determining a pre-coding matrix according to an embodiment of the invention.

As illustrated in FIG. 6, a network-side device in a system for determining a pre-coding matrix according to an embodiment of the invention includes a receiving module 600 and a third determining module 610, where:

The receiving module 600 is configured to receive overall pre-coding matrix information from a user equipment; and The third determining module 610 is configured to determine an overall pre-coding matrix according to the overall pre-coding matrix information;

Where the overall pre-coding matrix is a sub-matrix of a third pre-coding matrix determined according to a first pre-coding matrix and a second pre-coding matrix.

Preferably the receiving module 600 is further configured:

To receive a first PMI, a first RI, a second PMI, and a second RI from the user equipment, where the first PMI is an index of the first pre-coding matrix in a codebook; the second PMI is an index of the second pre-coding matrix in the codebook; the first RI is the number of columns or the number of rows in the first pre-coding matrix; and the second RI is the number of columns or the number of rows in the second pre-coding matrix; and The third determining module 610 is configured:

To determine the first pre-coding matrix according to the first PMI and the first RI, and the second pre-coding matrix according to the second PMI and the second RI; and to determine the third pre-coding matrix according to the first pre-coding matrix and the second pre-coding matrix, and to determine the overall pre-coding matrix according to the third pre-coding matrix.

Preferably the third pre-coding matrix is $W=W1 \otimes W2$ or $W=W2 \otimes W1$;

Where W1 represents the first pre-coding matrix, W2 represents the second pre-coding matrix, and $A \otimes B$ represents a Kronecker product of a matrix A and a matrix B.

Preferably the overall pre-coding matrix is a matrix composed of N columns or N rows in the third pre-coding matrix.

Preferably the overall pre-coding matrix is a matrix composed of first N columns or first N rows in the third pre-coding matrix.

Preferably N is no more than the product of the number of columns in the first pre-coding matrix and the number of columns of the second pre-coding matrix; or N is no more than the product of the number of rows in the first pre-coding matrix and the number of rows in the second pre-coding matrix.

Preferably the third determining module 610 is further configured:

To permute the first pre-coding matrix according to a first CQI corresponding to each codeword; and/or to permute the second pre-coding matrix according to a second CQI corresponding to each codeword, before the third pre-coding matrix is determined according to the first pre-coding matrix and the second pre-coding matrix.

Preferably the overall pre-coding matrix information comprises an overall RI, where the overall RI is the number of columns or the number of rows in the overall pre-coding matrix.

Preferably the third determining module 610 is configured:

If the overall pre-coding matrix information is a matrix indicator, to determine a candidate matrix corresponding to a value of the matrix indicator as the overall pre-coding matrix, where one of values of the matrix indicator corresponds to one of candidate matrixes determined from the third pre-coding matrix; or to combine the corresponding rows or columns in the third pre-coding matrix into the overall pre-coding matrix according to the values of the bits in the matrix indicator.

Preferably the third determining module 610 is further configured:

To modulate and/or select a coding rate according to a received overall CQI from the user equipment, where the overall CQI is determined by the user equipment under the assumption that the network-side device transmits data to the user equipment using the overall pre-coding matrix.

Based upon the same inventive idea, an embodiment of the invention further provides a method for determining a pre-coding matrix, and since the method addresses the problem under a similar principle to the system for determining a pre-coding matrix according to the embodiment of the invention, reference can be made to the implementation of the system for an implementation of the method, so a repeated description thereof will be omitted here.

Figure 7:
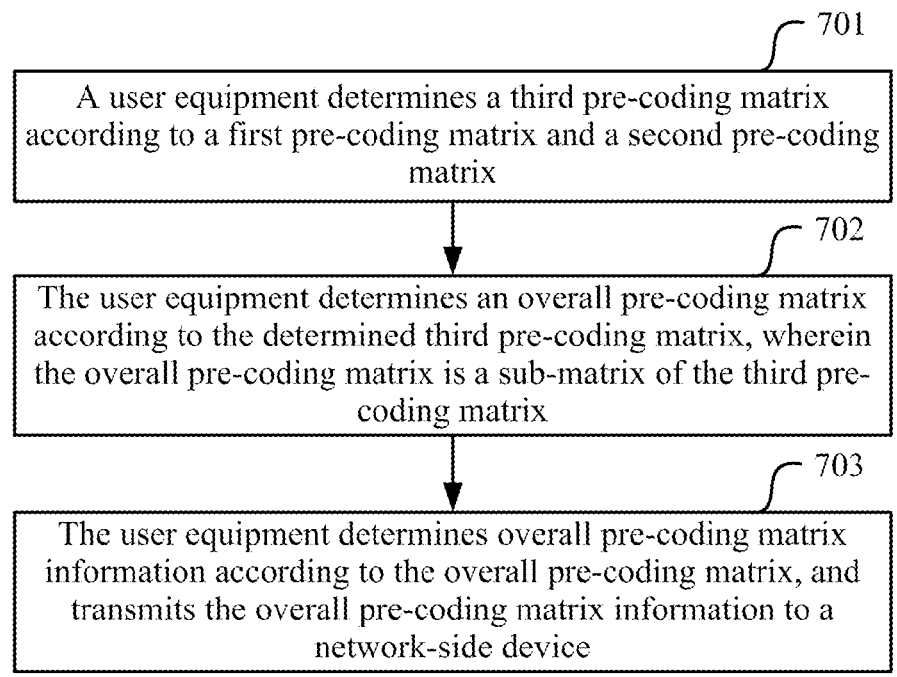
FIG. 7 illustrates a schematic flow chart of a method for feeding back channel state information according to an embodiment of the invention.

As illustrated in FIG. 7, a method for determining a pre-coding matrix according to an embodiment of the invention includes the following steps:

Step 701. A user equipment determines a third pre-coding matrix according to a first pre-coding matrix and a second pre-coding matrix;

Step 702. The user equipment determines an overall pre-coding matrix according to the determined third pre-coding matrix, wherein the overall pre-coding matrix is a sub-matrix of the third pre-coding matrix; and Step 703. The user equipment determines overall pre-coding matrix information according to the overall pre-coding matrix, and transmits the overall pre-coding matrix information to a network-side device.

Preferably after the user equipment determines the first pre-coding matrix and the second pre-coding matrix, the method further includes:

The user equipment transmits a first PMI, a first RI, a second PMI, and a second RI to the network-side device after the first pre-coding matrix and the second pre-coding matrix are determined;

Where the first PMI is an index of the first pre-coding matrix in a codebook; the second PMI is an index of the second pre-coding matrix in the codebook; the first RI is the number of columns or the number of rows in the first pre-coding matrix; and the second RI is the number of columns or the number of rows in the second pre-coding matrix.

Preferably the third pre-coding matrix is W=W1⊗W2 or W=W2⊗W1;

Where W1 represents the first pre-coding matrix, W2 represents the second pre-coding matrix, and A⊗B represents a Kronecker product of a matrix A and a matrix B.

Preferably the overall pre-coding matrix is a matrix composed of N columns or N rows in the third pre-coding matrix.

Preferably the overall pre-coding matrix is a matrix composed of first N columns or first N rows in the third pre-coding matrix.

Preferably N is no more than the product of the number of columns in the first pre-coding matrix and the number of columns of the second pre-coding matrix; or N is no more than the product of the number of rows in the first pre-coding matrix and the number of rows in the second pre-coding matrix.

Preferably before the user equipment determines the third pre-coding matrix according to the first pre-coding matrix and the second pre-coding matrix, the method further includes:

The user equipment permutes the first pre-coding matrix according to a first CQI corresponding to each codeword; and/or permutes the second pre-coding matrix according to a second CQI corresponding to each codeword.

Preferably the overall pre-coding matrix information is an overall RI, where the overall RI is the number of columns or the number of rows in the overall pre-coding matrix.

Preferably the overall pre-coding matrix information is a matrix indicator; and

The user equipment determining the overall pre-coding matrix information according to the overall pre-coding matrix includes:

The user equipment sets a value of the matrix indicator to a value indicating that a corresponding candidate matrix is the overall pre-coding matrix, where one of values of the matrix indicator corresponds to one of candidate matrixes determined according to the third pre-coding matrix; or sets a value of a bit in the matrix indicator corresponding to a row or column in the third pre-coding matrix to a value indicating that the overall pre-coding matrix includes the corresponding row or column.

Preferably after the user equipment determines the overall pre-coding matrix, the method further includes:

The user equipment determines an overall CQI, where the overall CQI is determined by the user equipment under the assumption that the network-side device transmits data to the user equipment using the overall pre-coding matrix; and The user equipment transmits the overall CQI to the network-side device, so that the network-side device modulates and/or selects a coding rate according to the overall CQI.

Based upon the same inventive idea, an embodiment of the invention further provides a method for determining a pre-coding matrix, and since the method addresses the problem under a similar principle to the system for determining a pre-coding matrix according to the embodiment of the invention, reference can be made to the implementation of the system for an implementation of the method, so a repeated description thereof will be omitted here.

Figure 8:
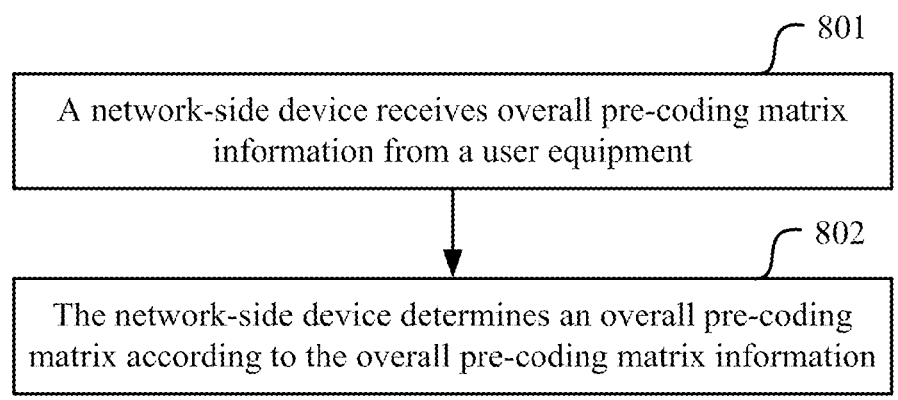
FIG. 8 illustrates a schematic flow chart of a method for determining a pre-coding matrix according to an embodiment of the invention.

As illustrated in FIG. 8, a method for determining a pre-coding matrix according to an embodiment of the invention includes the following steps:

Step 801. A network-side device receives overall pre-coding matrix information from a user equipment; and Step 802. The network-side device determines an overall pre-coding matrix according to the overall pre-coding matrix information;

Where the overall pre-coding matrix is a sub-matrix of a third pre-coding matrix determined according to a first pre-coding matrix and a second pre-coding matrix.

Preferably before the network-side device determines the overall pre-coding matrix according to the overall pre-coding matrix information, the method further includes:

The network-side device receives a first PMI, a first RI, a second PMI, and a second RI from the user equipment, where the first PMI is an index of the first pre-coding matrix in a codebook; the second PMI is an index of the second pre-coding matrix in the codebook; the first RI is the number of columns or the number of rows in the first pre-coding matrix; and the second RI is the number of columns or the number of rows in the second pre-coding matrix; and The network-side device determining the overall pre-coding matrix according to the overall pre-coding matrix information includes:

The network-side device determines the first pre-coding matrix according to the first PMI and the first RI, and the second pre-coding matrix according to the second PMI and the second RI; and The network-side device determines the third pre-coding matrix according to the first pre-coding matrix and the second pre-coding matrix, and determines the overall pre-coding matrix according to the third pre-coding matrix.

Preferably the third pre-coding matrix is W=W1⊗W2 or W=W2⊗W1;

W1 represents the first pre-coding matrix, W2 represents the second pre-coding matrix, and A⊗B represents a Kronecker product of a matrix A and a matrix B.

Preferably the overall pre-coding matrix is a matrix composed of N columns or N rows in the third pre-coding matrix.

Preferably the overall pre-coding matrix is a matrix composed of first N columns or first N rows in the third pre-coding matrix.

Preferably N is no more than the product of the number of columns in the first pre-coding matrix and the number of columns of the second pre-coding matrix; or N is no more than the product of the number of rows in the first pre-coding matrix and the number of rows in the second pre-coding matrix.

Preferably before the network-side device determines the third pre-coding matrix according to the first pre-coding matrix and the second pre-coding matrix, the method further includes:

The network-side device permutes the first pre-coding matrix according to a first CQI corresponding to each codeword; and/or permutes the second pre-coding matrix according to a second CQI corresponding to each codeword.

Preferably the overall pre-coding matrix information comprises an overall RI, where the overall RI is the number of columns or the number of rows in the overall pre-coding matrix.

Preferably the overall pre-coding matrix information is a matrix indicator; and

The network-side device determining the overall pre-coding matrix from the third matrix includes:

The network-side device determines a candidate matrix corresponding to a value of the matrix indicator as the overall pre-coding matrix, where one of values of the matrix indicator corresponds to one of candidate matrixes determined according to the third pre-coding matrix; or to combine the corresponding rows or columns in the third pre-coding matrix into the overall pre-coding matrix according to the values of the bits in the matrix indicator.

Preferably the method further includes:

The network-side device modulates and/or selects a coding rate according to a received overall CQI from the user equipment;

The overall CQI is determined by the user equipment under the assumption that the network-side device transmits data to the user equipment using the overall pre-coding matrix.

Figure 9:
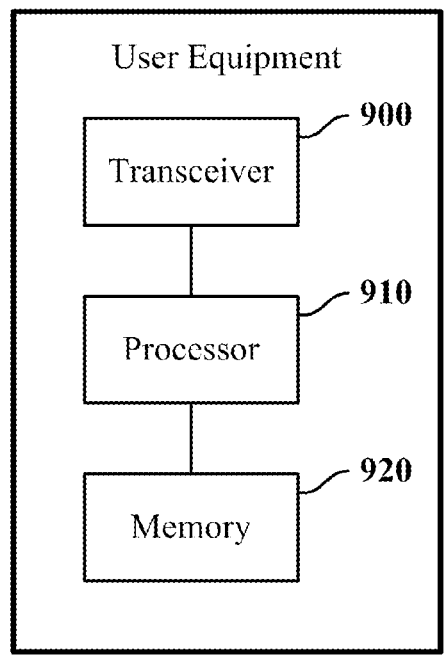
FIG. 9 illustrates a schematic structural diagram of a user equipment according to another embodiment of the invention.

Referring to FIG. 9, there is illustrated a schematic structural diagram of a user equipment according to another embodiment of the invention, which can perform the flow according to the embodiment above of the invention. As illustrated, the user equipment can include a transceiver 900, a processor 910, and a memory 920.

The transceiver 900 can include a baseband processing component, a radio frequency component and other devices configured to transmit related information, as needed in reality;

The memory 920 is configured to store one or more executable programs, wherein the one or more executable programs are utilized for configuring the processor 910; and The processor 910 is configured with the one or more executable programs to perform a method including: determining a third pre-coding matrix according to a first pre-coding matrix and a second pre-coding matrix; determining an overall pre-coding matrix according to the determined third pre-coding matrix, the overall pre-coding matrix is a sub-matrix of the third pre-coding matrix; and determining overall pre-coding matrix information according to the overall pre-coding matrix, and transmitting the overall pre-coding matrix information to a network-side device through the transceiver 900.

Furthermore the processor 910 is further configured to transmit a first PMI, a first RI, a second PMI, and a second RI to the network-side device through the transceiver 900, where the first PMI is an index of the first pre-coding matrix in a codebook; the second PMI is an index of the second pre-coding matrix in the codebook; the first RI is the number of columns or the number of rows in the first pre-coding matrix; and the second RI is the number of columns or the number of rows in the second pre-coding matrix.

Preferably the third pre-coding matrix is $W=W1 \otimes W2$ or $W=W2 \otimes W1$, where W1 represents the first pre-coding matrix, W2 represents the second pre-coding matrix, and $A \otimes B$ represents a Kronecker product of a matrix A and a matrix B.

Preferably the overall pre-coding matrix is a matrix composed of N columns or N rows in the third pre-coding matrix.

Preferably the overall pre-coding matrix is a matrix composed of first N columns or first N rows in the third pre-coding matrix.

Preferably N is no more than the product of the number of columns in the first pre-coding matrix and the number of columns of the second pre-coding matrix; or N is no more than the product of the number of rows in the first pre-coding matrix and the number of rows in the second pre-coding matrix.

Preferably the processor 910 is further configured to permute the first pre-coding matrix according to a first CQI corresponding to each codeword; and/or to permute the second pre-coding matrix according to a second CQI corresponding to each codeword, before determining the third pre-coding matrix according to the first pre-coding matrix and the second pre-coding matrix.

Preferably the overall pre-coding matrix information comprises an overall RI, where the overall RI is the number of columns or the number of rows in the overall pre-coding matrix.

Preferably the processor 910 is configured, if the overall pre-coding matrix information is a matrix indicator, to set a value of the matrix indicator to a value indicating that a corresponding candidate matrix is the overall pre-coding matrix, where one of values of the matrix indicator corresponds to one of candidate matrixes determined according to the third pre-coding matrix; or to set a value of a bit in the matrix indicator corresponding to a row or column in the third pre-coding matrix to a value indicating that the overall pre-coding matrix includes the corresponding row or column.

Preferably the processor 910 is further configured to determine an overall CQI, where the overall CQI is determined by the user equipment under the assumption that the network-side device transmits data to the user equipment using the overall pre-coding matrix; and to transmit the overall CQI to the network-side device, so that the network-side device modulates and/or selects a coding rate according to the overall CQI.

Figure 10:
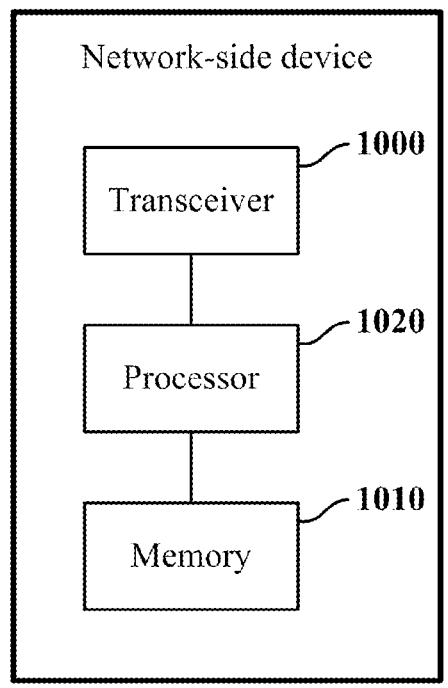
FIG. 10 illustrates a schematic structural diagram of a network-side device according to another embodiment of the invention.

Referring to FIG. 10, there is illustrated a schematic structural diagram of a network-side device according to another embodiment of the invention, which can perform the flow according to the embodiment above of the invention. As illustrated, the user equipment can include a transceiver 1000, a memory 1010, and a processor 1020.

The transceiver 1000 can include a baseband processing component, a radio frequency component and other devices configured to transmit related information, as needed in reality. In this embodiment, the transceiver 1000 is configured to receive overall pre-coding matrix information from a user equipment;

The memory 1010 is configured to store one or more executable programs for configuring the processor 1020; and The processor 1020 is configured with the one or more executable programs to perform a method including: determining an overall pre-coding matrix according to the overall pre-coding matrix information, where the overall pre-coding matrix is a sub-matrix of a third pre-coding matrix determined according to a first pre-coding matrix and a second pre-coding matrix.

Preferably the transceiver 1000 is further configured to receive a first PMI, a first RI, a second PMI, and a second RI from the user equipment, where the first PMI is an index of the first pre-coding matrix in a codebook; the second PMI is an index of the second pre-coding matrix in the codebook; the first RI is the number of columns or the number of rows in the first pre-coding matrix; and the second RI is the number of columns or the number of rows in the second pre-coding matrix. Correspondingly the processor 1020 is configured to determine the first pre-coding matrix according to the first PMI and the first RI, and the second pre-coding matrix according to the second PMI and the second RI; and to determine the third pre-coding matrix according to the first pre-coding matrix and the second pre-coding matrix, and to determine the overall pre-coding matrix according to the third pre-coding matrix.

Preferably the third pre-coding matrix is $W=W1 \otimes W2$ or $W=W2 \otimes W1$, where W1 represents the first pre-coding matrix, W2 represents the second pre-coding matrix, and $A \otimes B$ represents a Kronecker product of a matrix A and a matrix B.

Preferably the overall pre-coding matrix is a matrix composed of N columns or N rows in the third pre-coding matrix.

Preferably the overall pre-coding matrix is a matrix composed of first N columns or first N rows in the third pre-coding matrix.

Preferably N is no more than the product of the number of columns in the first pre-coding matrix and the number of columns of the second pre-coding matrix; or N is no more than the product of the number of rows in the first pre-coding matrix and the number of rows in the second pre-coding matrix.

Preferably the processor 1020 is further configured to permute the first pre-coding matrix according to a first CQI corresponding to each codeword; and/or to permute the second pre-coding matrix according to a second CQI corresponding to each codeword, before determining the third pre-coding matrix according to the first pre-coding matrix and the second pre-coding matrix.

Preferably the overall pre-coding matrix information comprises an overall RI, where the overall RI is the number of columns or the number of rows in the overall pre-coding matrix.

Preferably the processor 1020 is configured, if the overall pre-coding matrix information is a matrix indicator, to determine a candidate matrix corresponding to a value of the matrix indicator as the overall pre-coding matrix, where one of values of the matrix indicator corresponds to one of candidate matrixes determined from the third pre-coding matrix; or to combine the corresponding rows or columns in the third pre-coding matrix into the overall pre-coding matrix according to the values of the bits in the matrix indicator.

Preferably the processor 1020 is further configured to modulate and/or select a coding rate according to a received overall CQI from the user equipment, where the overall CQI is determined by the user equipment under the assumption that the network-side device transmits data to the user equipment using the overall pre-coding matrix.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for determining a pre-coding matrix, the method comprising:
    performing, by a user equipment, channel estimation to obtain channel estimate values;
    determining, by the user equipment, a first pre-coding matrix and a second pre-coding matrix based on the channel estimate values;
    determining, by the user equipment, a third pre-coding matrix according to the first pre-coding matrix and the second pre-coding matrix;
    determining, by the user equipment, an overall pre-coding matrix according to the determined third pre-coding matrix and the channel estimate values, wherein the overall pre-coding matrix is a sub-matrix of the third pre-coding matrix; and determining, by the user equipment, overall pre-coding matrix information according to the overall pre-coding matrix, and transmitting the overall pre-coding matrix information to a network-side device, so that the network-side device transmits data to the user equipment by the overall pre-coding matrix;

wherein the overall pre-coding matrix information comprises a matrix indicator; and determining, by the user equipment, the overall pre-coding matrix information according to the overall pre-coding matrix comprises:

setting, by the user equipment, a value of the matrix indicator to a value indicating that a corresponding candidate matrix is the overall pre-coding matrix, wherein one of values of the matrix indicator corresponds to one of candidate matrixes determined according to the third pre-coding matrix; or setting, by the user equipment, a value of a bit in the matrix indicator corresponding to a row or column in the third pre-coding matrix to a value indicating that the overall pre-coding matrix comprises the corresponding row or column.

2. The method according to claim 1, wherein the method further comprises:

transmitting, by the user equipment, a first Pre-coding Matrix Indicator (PMI), a first Rank Indicator (RI), a second PMI, and a second RI to the network-side device;

wherein the first PMI is an index of the first pre-coding matrix in a codebook; the second PMI is an index of the second pre-coding matrix in the codebook; the first RI is the number of columns or the number of rows in the first pre-coding matrix; and the second RI is the number of columns or the number of rows in the second pre-coding matrix.

3. The method according to claim 1, wherein the third pre-coding matrix is $W=W1 \otimes W2$ or $W=W2 \otimes W1$;

wherein W1 represents the first pre-coding matrix, W2 represents the second pre-coding matrix, and $A \otimes B$ represents a Kronecker product of a matrix A and a matrix B.

4. The method according to claim 1, wherein the overall pre-coding matrix is a matrix composed of N columns or N rows in the third pre-coding matrix, wherein N represents a positive integer; and the overall pre-coding matrix is a matrix composed of first N columns or first N rows in the third pre-coding matrix.

5. The method according to claim 1, wherein before the user equipment determines the third pre-coding matrix according to the first pre-coding matrix and the second pre-coding matrix, the method further comprises:

permuting, by the user equipment, the first pre-coding matrix according to a first CQI corresponding to each codeword; and/or permuting, by the user equipment, the second pre-coding matrix according to a second CQI corresponding to each codeword.

6. A method for determining a pre-coding matrix, the method comprising:

receiving, by a network-side device, overall pre-coding matrix information from a user equipment;

receiving, by the network-side device, first pre-coding matrix information and second pre-coding matrix information from the user equipment;

determining, by the network-side device, a first pre-coding matrix and a second pre-coding matrix according to the first pre-coding matrix information and the second pre-coding matrix information, and determining a third pre-coding matrix according to the first and second pre-coding matrices;

determining, by the network-side device, an overall pre-coding matrix according to the overall pre-coding matrix information and the third pre-coding matrix; and transmitting, by the network-side, data to the user equipment by the overall pre-coding matrix;

wherein the overall pre-coding matrix is a sub-matrix of the third pre-coding matrix; and the first pre-coding matrix information and the second pre-coding matrix information are determined by the user equipment based on channel estimate values, which are obtained by the user equipment performing channel estimation.

7. The method according to claim 6, wherein receiving, by the network-side device, first pre-coding matrix information and second pre-coding matrix information from the user equipment comprises:

receiving, by the network-side device, a first PMI, a first RI, a second PMI, and a second RI from the user equipment, wherein the first PMI is an index of the first pre-coding matrix in a codebook; the second PMI is an index of the second pre-coding matrix in the codebook; the first RI is the number of columns or the number of rows in the first pre-coding matrix; and the second RI is the number of columns or the number of rows in the second pre-coding matrix; and determining, by the network-side device, the overall pre-coding matrix according to the overall pre-coding matrix information and the third pre-coding matrix comprises:

determining, by the network-side device, the first pre-coding matrix according to the first PMI and the first RI, and the second pre-coding matrix according to the second PMI and the second RI; and determining, by the network-side device, the third pre-coding matrix according to the first pre-coding matrix and the second pre-coding matrix, and determining the overall pre-coding matrix according to the third pre-coding matrix.

8. The method according to claim 6, wherein the third pre-coding matrix is $W=W1 \otimes W2$ or $W=W2 \otimes W1$;

wherein W1 represents the first pre-coding matrix, W2 represents the second pre-coding matrix, and $A \otimes B$ represents a Kronecker product of a matrix A and a matrix B.

9. The method according to claim 6, wherein the overall pre-coding matrix is a matrix composed of N columns or N rows in the third pre-coding matrix; and the overall pre-coding matrix is a matrix composed of first N columns or first N rows in the third pre-coding matrix.

10. The method according to claim 6, wherein before the network-side device determines the third pre-coding matrix according to the first pre-coding matrix and the second pre-coding matrix, the method further comprises:

permuting, by the network-side device, the first pre-coding matrix according to a first CQI corresponding to each codeword; and/or permuting, by the network-side device, the second pre-coding matrix according to a second CQI corresponding to each codeword.

11. The method according to claim 6, wherein the overall pre-coding matrix information comprises an overall RI, wherein the overall RI is the number of columns or the number of rows in the overall pre-coding matrix;

or, the overall pre-coding matrix information comprises a matrix indicator; and determining, by the network-side device, the overall pre-coding matrix according to the overall pre-coding matrix information comprises:

determining, by the network-side device, a candidate matrix corresponding to a value of the matrix indicator as the overall pre-coding matrix, wherein one of values of the matrix indicator corresponds to one of candidate matrixes determined according to the third pre-coding matrix;

or combining, by the network-side device, the corresponding rows or columns in the third pre-coding matrix into the overall pre-coding matrix according to the values of the bits in the matrix indicator.

12. A user equipment, comprising a transceiver, a processor and a memory, wherein:

the memory is configured to store one or more executable programs, wherein the one or more executable programs are executed by the processor to perform channel estimation to obtain channel estimate values, to determine a first pre-coding matrix and a second pre-coding matrix based on the channel estimate values; and determine a third pre-coding matrix according to the first pre-coding matrix and the second pre-coding matrix; determine an overall pre-coding matrix according to the determined third pre-coding matrix and the channel estimate values, wherein the overall pre-coding matrix is a sub-matrix of the third pre-coding matrix; and determine overall pre-coding matrix information from the overall pre-coding matrix, and transmit the overall pre-coding matrix information to a network-side device through the transceiver so that the network-side device transmits data to the user equipment by the overall pre-coding matrix;

wherein the overall pre-coding matrix information comprises a matrix indicator; and the processor is configured to:

set a value of the matrix indicator to a value indicating that a corresponding candidate matrix is the overall pre-coding matrix, wherein one of values of the matrix indicator corresponds to one of candidate matrixes determined according to the third pre-coding matrix; or set a value of a bit in the matrix indicator corresponding to a row or column in the third pre-coding matrix to a value indicating that the overall pre-coding matrix comprises the corresponding row or column.

13. The user equipment according to claim 12, wherein the third pre-coding matrix is $W=W1 \otimes W2$ or $W=W2 \otimes W1$;

wherein W1 represents the first pre-coding matrix, W2 represents the second pre-coding matrix, and $A \otimes B$ represents a Kronecker product of a matrix A and a matrix B.

14. The user equipment according to claim 12, wherein the overall pre-coding matrix is a matrix composed of N columns or N rows in the third pre-coding matrix; and the overall pre-coding matrix is a matrix composed of first N columns or first N rows in the third pre-coding matrix.

15. The user equipment according to claim 12, wherein the processor is further configured to permute the first pre-coding matrix according to a first CQI corresponding to each codeword; and/or to permute the second pre-coding matrix according to a second CQI corresponding to each codeword, before determining the third pre-coding matrix according to the first pre-coding matrix and the second pre-coding matrix.

16. A network-side device, comprising a transceiver, a memory, and a processor, wherein:

the transceiver is configured to receive overall pre-coding matrix information, first pre-coding matrix information and second pre-coding matrix information from a user equipment;

the memory is configured to store one or more executable programs, wherein the one or more executable programs are executed by the processor to determine a first pre-coding matrix and a second pre-coding matrix according to the first pre-coding matrix information and the second pre-coding matrix information, determine a third pre-coding matrix according to the first and second pre-coding matrices, determine an overall pre-coding matrix according to the overall pre-coding matrix information and the third pre-coding matrix, and transmit data to the user equipment by the overall pre-coding matrix;

wherein the overall pre-coding matrix is a sub-matrix of the third pre-coding matrix; and the first pre-coding matrix information and the second pre-coding matrix information are determined by the user equipment based on channel estimate values, which are obtained by the user equipment performing channel estimation.

17. The network-side device according to claim 16, wherein the third pre-coding matrix is $W=W1 \otimes W2$ or $W=W2 \otimes W1$;

wherein W1 represents the first pre-coding matrix, W2 represents the second pre-coding matrix, and $A \otimes B$ represents a Kronecker product of a matrix A and a matrix B.

18. The network-side device according to claim 16, wherein the overall pre-coding matrix is a matrix composed of N columns or N rows in the third pre-coding matrix; and the overall pre-coding matrix is a matrix composed of first N columns or first N rows in the third pre-coding matrix.

19. The network-side device according to claim 16, wherein the processor is further configured:

to permute the first pre-coding matrix according to a first CQI corresponding to each codeword; and/or to permute the second pre-coding matrix according to a second CQI corresponding to each codeword, before determining the third pre-coding matrix according to the first pre-coding matrix and the second pre-coding matrix.

* * * * *